United States Patent
Prokopenko et al.

(10) Patent No.: US 7,659,898 B2
(45) Date of Patent: *Feb. 9, 2010

(54) MULTI-EXECUTION RESOURCE GRAPHICS PROCESSOR

(75) Inventors: Boris Prokopenko, Milpitas, CA (US); Timour Paltashev, Fremont, CA (US)

(73) Assignee: VIA Technologies, Inc., Hsin-Tien, Taipei (TW)

( * ) Notice: Subject to any disclaimer, the term of this patent is extended or adjusted under 35 U.S.C. 154(b) by 538 days.

This patent is subject to a terminal disclaimer.

(21) Appl. No.: 11/199,357

(22) Filed: Aug. 8, 2005

(65) Prior Publication Data

US 2007/0030278 A1    Feb. 8, 2007

(51) Int. Cl.
*G06F 15/80* (2006.01)
*G06F 15/16* (2006.01)
*G09G 5/36* (2006.01)

(52) U.S. Cl. .................. 345/505; 345/557; 345/504

(58) Field of Classification Search .......... 345/501, 345/502, 504, 505, 506, 530, 541, 557; 711/118, 711/130, 147; 712/10, 11, 28, 31; 718/102
See application file for complete search history.

(56) References Cited

U.S. PATENT DOCUMENTS

| | | | |
|---|---|---|---|
| 4,893,234 A * | 1/1990 | Davidson et al. | 712/27 |
| 5,544,161 A | 8/1996 | Bigham et al. | 370/58.1 |
| 5,560,025 A * | 9/1996 | Gupta et al. | 712/23 |
| 5,644,622 A | 7/1997 | Russell et al. | 455/422 |
| 5,699,537 A | 12/1997 | Sharangpani et al. | 395/393 |
| 6,345,287 B1 | 2/2002 | Fong et al. | 709/102 |
| 6,573,905 B1 * | 6/2003 | MacInnis et al. | 345/629 |
| 6,657,632 B2 * | 12/2003 | Emmot et al. | 345/502 |
| 6,683,615 B1 * | 1/2004 | Baldwin | 345/543 |
| 6,809,734 B2 * | 10/2004 | Suzuoki et al. | 345/506 |
| 6,867,783 B2 * | 3/2005 | Moriwaki et al. | 345/536 |
| 6,985,150 B2 * | 1/2006 | Deering | 345/506 |
| 2002/0138637 A1 | 9/2002 | Suzuoki et al. | 709/230 |
| 2002/0138701 A1 | 9/2002 | Suzuoki et al. | 711/154 |
| 2002/0138707 A1 | 9/2002 | Suzuoki et al. | 711/163 |
| 2002/0156993 A1 | 10/2002 | Suzuoki et al. | 712/30 |
| 2004/0143593 A1 * | 7/2004 | Le Maut et al. | 707/102 |

* cited by examiner

*Primary Examiner*—Joni Hsu
(74) *Attorney, Agent, or Firm*—Thomas, Kayden, Horstemeyer & Risley

(57) ABSTRACT

A dynamically scheduled parallel graphics processor comprises a spreader that creates graphic objects for processing and assigns and distributes the created objects for processing to one or more execution blocks. Each execution block is coupled to the spreader and receives an assignment for processing a graphics object. The execution block pushes the object through each processing stage by scheduling the processing of the graphics object and executing instruction operations on the graphics object. The dynamically scheduled parallel graphics processor includes one or more fixed function units coupled to the spreader that are configured to execute one or more predetermined operations on a graphics object. An input/output unit is coupled to the spreader, the one or more fixed function units, and the plurality of execution blocks and is configured to provide access to memory external to the dynamically scheduled parallel graphics processor.

17 Claims, 10 Drawing Sheets

MULTI-EXECUTION RESOURCE GRAPHICS PROCESSOR

CROSS-REFERENCE TO RELATED APPLICATIONS

This application is related to the following copending U.S utility patent applications: (1) U.S. patent application Ser. No. 11/199,458 entitled "SYSTEM AND METHOD TO MANAGE DATA PROCESSING STAGES OF A LOGICAL GRAPHICS PIPELINE," filed on Aug. 8, 2005, under Express Mail Label EV5595725568US; (2) U.S. patent application Ser. No. 11/199,353 entitled "METHOD FOR PROCESSING VERTEX, TRIANGLE, AND PIXEL GRAPHICS DATA PACKETS," filed on Aug. 8, 2005; under Express Mail Label EV559572660US; and (3) U.S. patent application Ser. No. 11/199,459 entitled "GLOBAL SPREADER AND METHOD FOR A PARALLEL GRAPHICS PROCESSOR," filed on Aug. 8, 2005, under Express Mail Label EV559572673US. Each of these patent applications is entirely incorporated herein by reference.

TECHNICAL FIELD

The present disclosure relates to an architecture for computer processors and computer networks and, in particular, to a system, and method for the creating and dynamic scheduling of multiple stream data processing tasks for execution in a parallel processor.

BACKGROUND

Microprocessor designers and manufacturers continue to focus on improving microprocessor performance to execute increasingly complex software, which delivers increased utility. While manufacturing process improvements can help to increase the speed of a microprocessor by reducing silicon geometries, the design of the processor, particularly the instruction execution core, relates to processor performance.

Many microprocessors use instruction pipelining to increase. instruction throughput. An instruction pipeline processes several instructions through different phases of instruction execution concurrently, using an assembly line approach. Individual function blocks such as a decode block, as a nonlimiting example, may be further pipelined into several stages of hardware, with each stage performing a step in the instruction decode process on a separate instruction. Thus, processor hardware pipelines can be deep with many distinct pipeline stages.

Another method to improve instruction execution speed is known as "out-of-order" execution. Out-of-order execution provides for the execution of instructions in an order different from the order in which the instructions are issued by the compiler in an effort to reduce the overall execution latency of the program including the instructions. One approach to out-of-order instruction execution uses a technique referred to as "register scoreboarding," in which instructions are issued in-order, but executed out-of-order. Another form of out-of-order scheduling employs a technique known as "dynamic scheduling." For a processor that provides dynamic scheduling, even the issue of instructions to execution hardware is rescheduled to be different from the original program order. The results of instruction execution may be available out of order, but the instructions are retired in program order. Yet, instruction pipelining in out-of-order techniques, such as dynamic scheduling, may be used separately or together in the same microprocessor.

Dynamic scheduling of parallel instruction execution may include special associative tables for bookkeeping instruction and functional unit status as well as the availability of a result of a particular instruction for usage as an input operand according to prescribed instructions. Scheduling hardware uses these tables to issue, execute, and complete individual instructions.

The scope of the dynamic scheduling of parallel instruction execution is instruction level parallelism (ILP), which has been extended to multiple threads (hyperthreading or simultaneous multithreading (SMT)). This technique provides hardware assisted dispatch and execution of multiple threads providing multiple instructions per clock issue to process in a parallel functional unit. Dynamic scheduling hardware provides simultaneous instruction issue from the multiple active threads.

Scheduling hardware may use scoreboards for the bookkeeping of thread and instruction status to trace dependencies and to define the moment of issue and execution. In addition, threads may be suspended because of long latency cache misses or other I/O reasons. Nevertheless, as a nonlimiting example, the scoreboard may be comprised of an instruction status, a functional unit status, as well as a register result status. All three of these tables interact in the process of instruction execution by updating their fields each clock cycle. In order to pass the stage and change status of an instruction, certain conditions should be fulfilled and certain actions should be taken on each stage.

Register renaming is another technique that may be implemented to overcome name dependency problems when architecture registers namespace is predetermined, which enables instructions to be executed in parallel. According to a register renaming technique, a new register may be allocated each time an assignment is made to a register. When an instruction is decoded, the hardware checks the destination field and renames the architecture register name space. As a nonlimiting example, if register R3 is assigned a value, a new register clone R3' may be allocated and all reads of register R3 in the following instructions are directed to clone R3' (replacing architecture name by clone name).

In continuing this nonlimiting example, when a new assignment is made to register R3, another register clone R3" is allocated and the following references are redirected to new clone R3". This process continues with all input instructions. This process not only removes name dependencies, but it also makes the processor appear to have more registers and may increase the instruction level parallelism so that more parallel units may operate.

Register renaming may also be used by reorder buffers so as to extend the architecture register space and create multiple copies of the same register associate with different commands. This results in the ability to provide out-of-order with in-order completion.

When an instruction is decoded, it may be assigned a reorder buffer entry associated with the appropriate function unit. The destination register of the decoded instruction may be associated with the allocated reorder buffer entry, which results in renaming the register. The processor hardware may generate a tag to uniquely identify this result. The tag may be stored in the reorder buffer entry. When a subsequent instruction refers to the rename destination register, it may receive the value or the tag stored in the reorder buffer entry, depending upon whether or not the data is received.

A reorder buffer may be configured as a content addressable memory (CAM) where the tag is used for a data search. In application, a destination register number of a subsequent instruction may be applied to a reorder buffer and the entry containing this register number may also be identified. Once identified, the calculated value is returned. If the value has not been computed, the tag, as described above, may be returned instead. If multiple entries contain this register number, then the latest entry is identified. If no entries contain the required register number, then the architecture register file is used.

When the result is produced, the result and tag may be broadcasted to all functional units.

Another processing approach involves real-time scheduling and multiprocessor systems. This configuration involves loosely coupled MIMD microprocessors, where each processor has its own memory and I/O channels. Several tasks and subtasks (threads) may run on these systems simultaneously. However, the tasks may include synchronization in some type of ordering to keep the intended processing pattern. Plus, the synchronization needed may be different for various processing patterns.

Unlike instruction level parallelism processors, real-time scheduling processors use processor assignment to task in threads (resource allocation). With the instruction level parallelism configuration, there may be specialized functional blocks with few of them duplicated, which means that instruction assignment for distribution is relatively simple depending upon the number of available slots and the type of instruction.

However, for multiprocessor systems of the MIMD type, all processors are typically similar and have a more complicated task assignment policy. At least one nonlimiting approach is to consider the MIMD structure as a processor pool, which means to treat the processor as a pooled resource and assign processes to processors depending upon availability of memory and computational resources.

There are at least two methodologies for distributing tasks and threads in this environment. The first is static assignment, which occurs when each type of task or thread is preassigned to a particular processor or group of processors. The second configuration is dynamic assignment, as similarly described above, which calls for tasks being assigned to any processor from the pool depending upon available resources and task priority. In this configuration, the multiprocessor pool may have special dispatch cues where tasks and threads are waiting for assignment and execution, as well as for I/O event completion. Also in this configuration, threads are parts of a task, and some of the tasks may be split into the several threads that may be executed in parallel with some synchronization on data and order. Thus, the threads in general may execute separately from the rest of the process. Also, an application can be a set of threads that cooperate and execute concurrently in the same address space but using different processors. As a result, threads running concurrently on separate processors may yield dynamic gain in performance.

In a multiprocessor configuration, thread scheduling may be accomplished according to load sharing techniques. Load sharing may call for the load being distributed evenly across the various microprocessors in the pool. As a result, this ensures that no microprocessor is idle.

Multiprocessor thread scheduling may also use some of the static scheduling techniques described above, such as when a thread is assigned to a specific processor. However, in assigning certain threads to a specific processor, other processors may be idle while the assigned processor is busy, thereby causing the assigned thread to sit idly waiting for its assigned processor to become free. Thus, there may be instances where static scheduling results in inefficiency in the processor.

Dynamic scheduling of processors may be implemented in an object oriented graphics pipeline. An object is a structured data item representing something travelling down a logical pipeline, such as a vertex of a triangle, patch, pixel, or video data. At the logical level, both numeric and control data may be part of the object, though the physical implementation may handle the two separately.

In a graphics model, there are several types of objects that may be processed in the data flow. The first is a state object, which contains hardware controlled information and shader code. Second, a vertex object may be processed, which contains several sets of vertices associated with numerical control data. Third, a primitive object may be processed in the data flow model which may contain a number of sets of primitive' associated numerical and control data. More specifically, a primitive object may include a patch object, triangle object, line object and/or point object. Fourth, a fragment object may be part of the data flow model which may contain several sets of pixel associated numerical and control data. Finally, other types of objects such as video data may be processed in a data flow model as well.

Each type of object may have a set of possible operations that may be performed on it and a (logically) fixed data layout. Objects may exist in different sizes and statuses, which also may be known as levels or stages to represent the position they have reached in the process in pipeline.

As a nonlimiting example, the levels of an object may be illustrated on a triangle object, which initially has three vertices that point to the actual location of vertex geometry and attribute data. When the references are resolved (check caches and retrieve data from API buffers if needed), the object level is upgraded so that the object is sent through other stages. The level of upgrade normally may reflect the availability of certain data in the object structure for immediate processing. An upgraded level includes the previous level in most cases.

One of ordinary skill in the art would know that there may generally be two types of sizes (layouts) of an object. A first is a logical layout, which may include all data structures. The logical layout may remain unchanged from the moment of object creation through termination. A second type of layout for objects is a physical layout that shows the data structure is available for immediate processing, which operates to match the logical layout in the uppermost level.

Both the logical and physical layouts may be expressed in terms of frames and buffers—logical frames and physical buffers. Logical frames may be mapped to physical buffers to make data structures available for immediate processing. Each object initially may contain few logical frames and one of them may be mapped to a physical buffer. All other frames used in later stages may not be mapped so as to save memory resources on the chip. Yet both frames and buffers may have variable size with flexible mapping to each other.

An object may refer to data held within other objects in the system. Pipeline lazy evaluation schemes track these dependencies and use them to compute the value stored inside an object on demand. Objects of the same type may be processed in parallel independent cues. Alternatively, a composite object may be created containing several vertices, fragments, or primitives to process in SIMD mode.

For graphics processing applications, the features described above have historically included fixed function and programmable hardware based pipeline solutions. However, these linear solutions oftentimes lead to inefficiencies resulting from the static configuration of the graphics pipeline. When the bandwidth of a particular stage as described above does not change during the execution time of the frame generation, inefficiencies and idle time in the processor are introduced, thereby decreasing the overall efficiency. This inefficiency is compounded in an application involving multiple parallel processors.

Thus, there is a heretofore-unaddressed need to overcome the problem of dynamic creating and execution management of multiple logic graphic pipelines in an MIMD structure of parallel multithread processors. There is a further need for improved resource utilization in parallel processing to achieve higher performance, which may be previously attributed to poor allocation and scheduling protocol resolution.

SUMMARY

This disclosure relates to a dynamic scheduling unit and method for a parallel graphics processor, which may process vertex entities, triangle entities, and pixel entities, as nonlimiting examples. The disclosure provides for the dynamic scheduling of multiple stream data processing tasks related to vertexes, triangles, and pixels. Stated another way, a parallel processor processes these entities in parallel simultaneously.

A dynamic scheduling unit for a parallel graphics processor comprises a spreader that creates graphic objects for processing. The spreader assigns and distributes the created objects for processing to one or more execution blocks. Each execution block receives an assignment for processing a graphics object and pushes the object through each processing stage by scheduling the processing of the graphics object and executing instruction operations on the graphics object.

The dynamic scheduling unit includes one or more fixed function units coupled to the spreader that are configured to execute one or more predetermined operations on a graphics object. An input/output unit is coupled to the spreader, the one or more fixed function units, and the plurality of execution blocks and is configured to provide access to memory external to the dynamic scheduling unit. This dynamic scheduling unit allocates resources for increased efficient processing, thereby resulting in improved performance.

Other systems, methods, features, and advantages of this disclosure will be or become apparent to one with skill in the art upon examination of the following drawings and detailed description. It is intended that all such additional systems, methods, features, and advantages be included within this description, be within the scope of this disclosure, and be protected by the accompanying claims.

DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure.

DETAILED DESCRIPTION

As opposed to static scheduling, as described above, dynamic scheduling may be employed during execution of threads such that a number of threads in a process may be altered dynamically by the application. Dynamic scheduling also results in assignment of idle processors to execute certain threads. This approach improves the use of the available processors and therefore the efficiency of the system.

Figure 1:
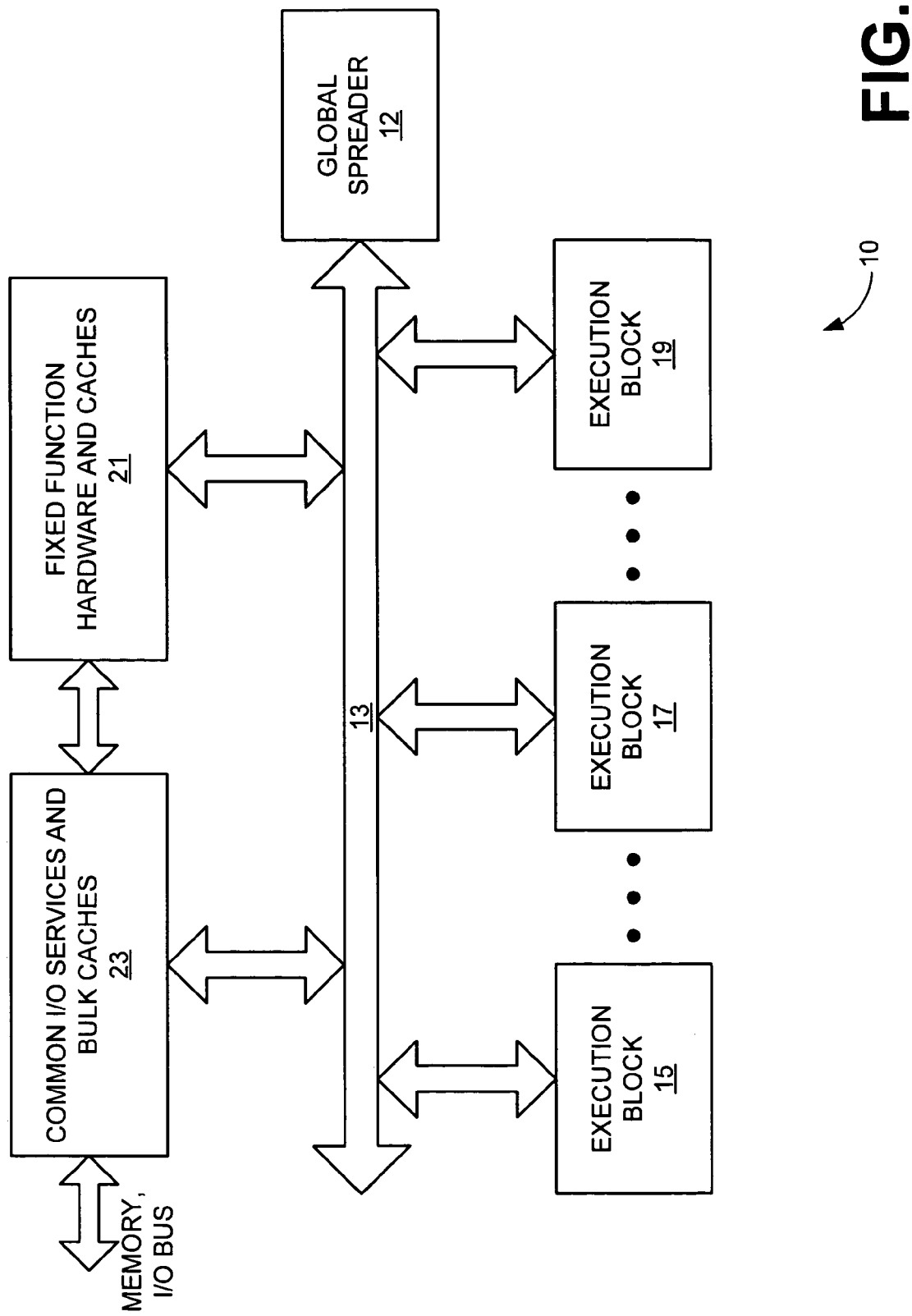
FIG. 1 is a diagram of an abstract hardware model of the object-oriented architecture of the current disclosure.

FIG. 1 is a diagram of an abstract hardware of the object-oriented architecture model 10 of the current disclosure. The object oriented architecture model 10 of FIG. 1 includes a general-purpose processing portion with a pool of execution blocks that provide local scheduling, data exchange, and processing of entities or objects.

The object-oriented architecture model 10 of FIG. 1 enables the dynamic scheduling for parallel graphics processing based upon the concept of dynamic scheduling instruction execution, which may be used in superscalar machines. This concept may be extended to threads and microthreads that are fragments of code to be executed on graphics data objects. As described herein, the dynamic scheduling approach is mapped to the logical graphics pipeline, where each part processes a specific type of graphics data object and executes threads containing several microthreads. More specifically, the course grained staging of the graphics pipeline may match threads on a level of object types, such as vertex, geometry, and pixel, wherein the fine grain staging is compared to microthreads.

Figure 3:
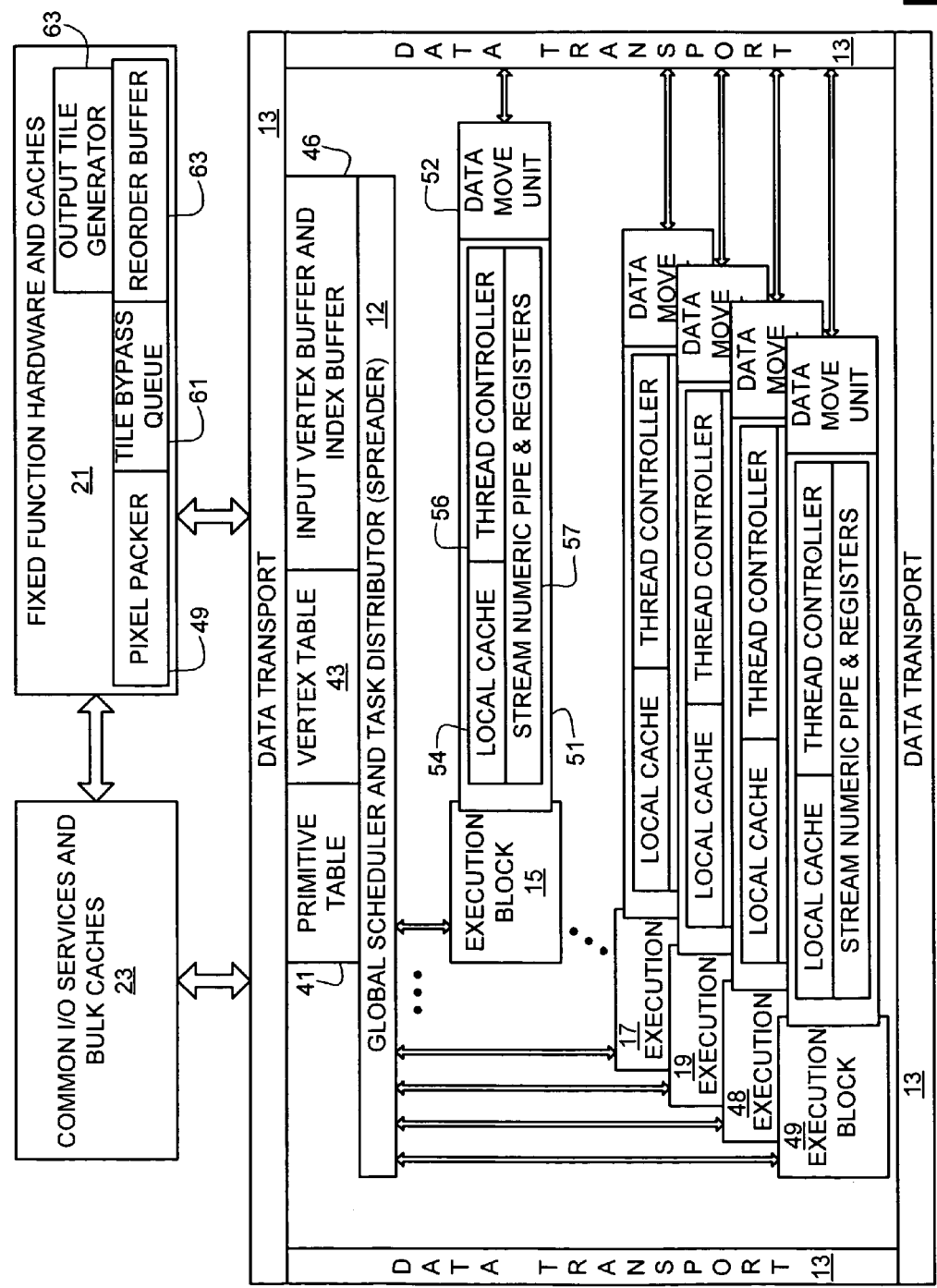
FIG. 3 is a diagram of the object oriented architecture model of FIG. 1 shown with additional operational blocks associated with the blocks of FIG. 1.

The object-oriented architecture model 10 includes a global scheduler and task distributor 12, which hereinafter is referred to as a global spreader 12. Global spreader 12 has attached vertex and index stream buffers, a vertex table, and a primitive table, as described in more detail below (FIG. 3). Global spreader 12 is coupled to the various components of the object oriented architecture model 10 via a data transport communication system 13, as one of ordinary skill in the art would know. The data transport communication system 13 couples all components of the architecture, as shown and described in FIG. 1.

Execution blocks 15, 17, and 19 provide local scheduling, data exchange, and processing of entities, as distributed by global spreader 12. The logical construction and operation of execution blocks 15, 17, and 19 are discussed in more detail below.

Fixed function hardware and cache unit 21 (hereinafter "fixed function unit 21") includes dedicated graphics resources for implementing the fixed function stages of graphics processing, such as rasterization, texturing, and output pixel processing parts. Additionally, an I/O common services and bulk cache block 23 is included in the object-oriented architecture model 10 of FIG. 1, which may be configured to comprise a command stream processor, memory and bus access, bulk cashes, and a display unit, all as nonlimiting examples.

Although discussed in more detail below, the global spreader 12 may utilize the data transport 13 for communicating with one or more of execution blocks 15, 17, and 19. However, the execution blocks 15, 17, and 19 may also communicate with each other via data transport 13 according to the various tasks and processes for which the execution blocks are assigned to execute by global spreader 12.

Global spreader 12 interacts with all of the execution blocks in the object-oriented architecture model 10 and traces available resources in the execution blocks 15, 17, and 19 with clock resolution. The task distribution configuration of the global spreader 12 may be fully programmable and adapted on a per frame monitoring basis of each execution block's profile.

Figure 2:
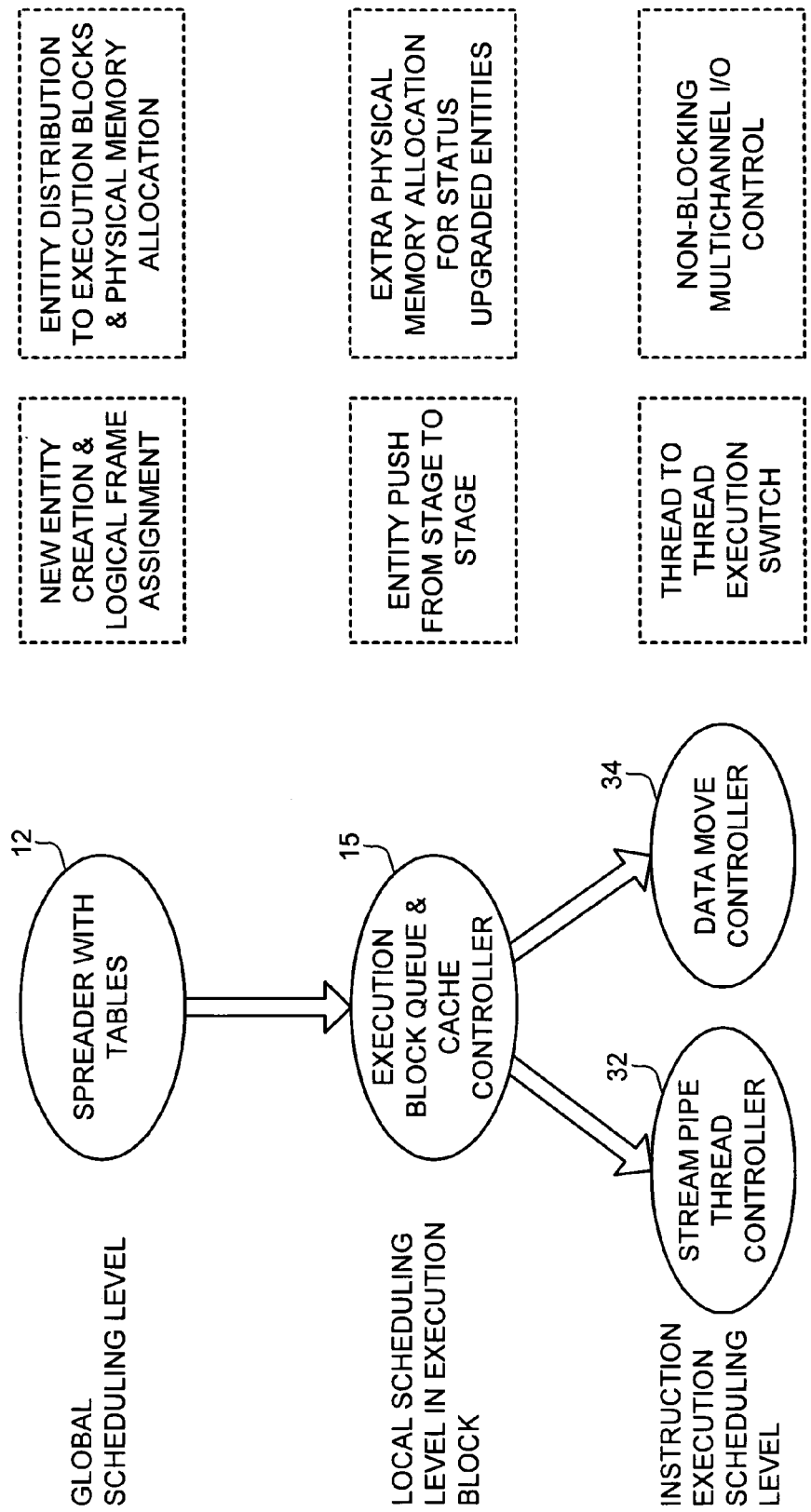
FIG. 2 is a diagram of the three levels of dynamic scheduling in the object oriented architecture model of FIG. 1.

FIG. 2 is a diagram of the three levels of dynamic scheduling implemented in the object oriented architecture model 10 of FIG. 1. At the global scheduling level, global spreader 12 operates with various tables and is also involved in new entity creation and logical frame assignment, as well as in the distribution to the various execution blocks 15, 17, and 19 and physical memory allocation (on the global scheduling level). Thus, as discussed above, the global spreader 12 interacts with the various execution blocks 15, 17, and 19 of FIG. 1, which are involved in the local scheduling level, as shown in FIG. 2. At the local scheduling level, a local task scheduler includes a local scoreboard. The local scoreboard comprises a queue and cache controller with a stage parser that operates to push entities from stage to stage through the processing pipeline (see FIGS. 5-9) as well as physical memory allocation for upgraded status entities throughout the execution of various processes.

At the instruction execution scheduling level, the execution blocks contain a numeric streampipe thread controller 32, which controls numerical processing of threads defined by stage parser 82. The instruction execution level also includes a data move controller 34, which enables execution of multiple threads across multiple execution blocks and implements multichannel I/O control. Stated another way, the data move controller 34 sends and receives data to/from other execution blocks as well as the global spreader 12.

All levels, including the global scheduling level, local scheduling level, and instruction execution level, include hardware controllers to provide dynamic scheduling with clock resolution. Moreover, the global and local scheduling controllers cooperate in computational resource allocation.

Figure 4:
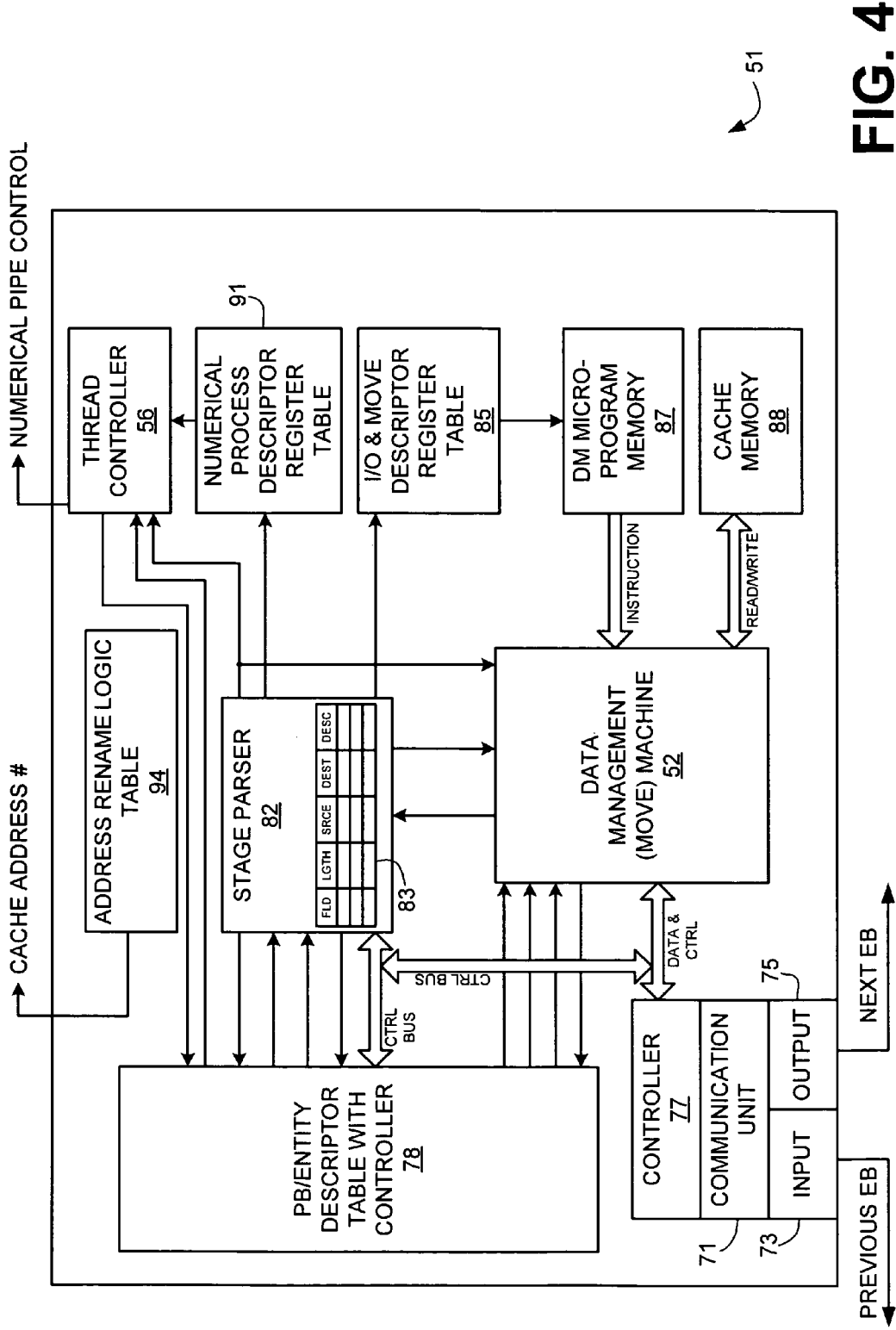
FIG. 4 is a diagram of the queue and cache controller of FIG. 3.

FIG. 3 is a diagram of the object-oriented architecture model 10 of FIG. 1 depicted with additional operational blocks associated with the global spreader 12, execution block 15, fixed function block 21, and common I/O services and bulk caches block 23. As shown in FIG. 3, the global spreader 12 includes a primitive table 41 (a table that contains references to basic elements), a vertex descriptor table (vertex allocation in all execution blocks) 43, and an input vertex buffer and index buffer 46. As discussed above, the global spreader 12 is the main upper level scheduling unit that distributes workload to all execution blocks 15, 17, 19, etc. by using the status information of the execution blocks and data received from the fixed function units 21. In interaction with the execution block' local queue-cache controller 51, as shown in FIG. 4, the global spreader 12 creates new entities to push into a logical pipeline.

The global spreader 12 controls data distribution between all execution blocks and uses the principle of locality of "producer-consumer" data references. As a nonlimiting example, global spreader 12 attempts to allocate vertex entities with associated triangle entities and distribute pixel packets from a particular triangle to an execution block that has triangle entity data. If this particular execution block does not have enough resources for allocation, vertex or triangle data may be copied to another execution block where triangle or pixel entities may have been sent.

In at least one nonlimiting example, the global spreader 12 may receive at least four types of input requests to arrange processing in the execution blocks. First, the spreader 12 may receive a packet of vertices, as generated by the input vertex buffer 46. Second, the global spreader 12 may receive a packet of triangles, as generated by triangle assembly hardware. The global spreader 12 may furthermore receive a packet of pixels (up to 16 pixels in at least one nonlimiting example), as created by a pixel packer 49, which may be a logical component of the fix function hardware and caches 21. As an additional nonlimiting example, the global spreader 12 may receive a BEZIER patch (16 vertices in at least one nonlimiting example), as created by the input vertex buffer 46.

For each type of data that the global spreader 12 receives, the global spreader 12 maintains and oversees various control information for each execution block in the object-oriented architecture model 10. In this nonlimiting example, as shown in FIG. 3, the object-oriented architecture model 10 includes execution blocks 15, 17, 19, 48, and 49. However, one of ordinary skill in the art would know that a greater or lesser number of execution blocks may be included according to the desired application. Nevertheless, as described above, global spreader 12 retains information at least relating to the number of available execution blocks at any given moment. Additionally, global spreader 12 retains information related to the minimal amount of resources needed to be free for a new entity of a particular type, as may be set by an external driver. The global spreader 12 also establishes the priority of each execution block as to receive a particular resource. In at least one nonlimiting example, the object-oriented architecture hardware model 10 may be configured with dedicated execution blocks for certain types of data and/or entities. Thus, in this instance, the global spreader 12 may be aware of these dedications so as to assign particular data to these execution blocks for processing.

The global spreader 12 also maintains data related to the size of data to be processed and copied to the execution block, as well as priority information related to the data or entity. The global spreader 12 may also retain data layout preferences. As a nonlimiting example, while vertices may implement no data layout preferences, triangles may be better constructed with their vertices as well as pixels with the triangles, therefore constituting a data layout preference. Thus, in this case, the global spreader 12 retains this information for more efficient processing.

The global spreader 12 includes a primitive table 41. Each triangle gets its primitive ID, which is stored in the primitive table 41 when the triangle entity is allocated. In this nonlimiting example, the primitive table 41 has two fields: PrID (primitive ID) and EB#, which corresponds to the execution block number, where the triangle entity is allocated. A pixel packet communicated from fixed function unit 21 carries a triangle ID, which can be used for lookup at the primitive table 41 to determine the logical location of the original triangle entity.

The global spreader 12 also includes a vertex descriptor table 43, which is a global vertex bookkeeping table for all execution blocks 15, 17, 19, 48, and 49 (in FIG. 3). The vertex descriptor table 43 contains records or information about the location of each group of eight vertices (or any number defined by SIMD factor of an execution block), which may be contained in a vertex packet being processed. In at least one nonlimiting example, the vertex descriptor table may contain approximately 256 records, including such information as the field name, the length of the field, the source of the field, which may, as nonlimiting examples, be the spreader 12, the vertex descriptor table control, or the queue cache controller 51 in a particular execution block. The vertex descriptor table 43 also retains destination information for the particular records as well as description information about the particular field of data. The vertex descriptor table operates in conjunction with the input vertex buffer and index buffer 46 when a vertex packet is received. The global spreader 12 creates a vertex entity and initiates transfer between the input vertex buffer and index buffer 46 and the allocated execution block memory, as described in more detail below.

As a nonlimiting example, if an incoming packet does not fit within the execution block pool, including execution blocks 15, 17, 19, 48, and 49 of FIG. 3, the global spreader 12 may not acknowledge the receiving of this data until the global spreader 12 can properly allocate a particular execution block with enough resources, such as memory space. In this instance, for a given packet of vertices, the global spreader 12 may be configured to perform a variety of actions. First, the global spreader 12 may seek a suitable execution block, such as execution block 17, using its resource requirement/allocation information, as described above. Alternatively, the global spreader 12 may communicate a request to a particular execution block, such as execution block 49, to allocate an entity for a received packet of vertices. If the packet of vertices received is not indexed, the global spreader 12 may create an index for it in the input vertex buffer 46. Additionally, the global spreader 12 may allocate an entry in the vertex table 43 and fill that entry with the index and number of the entity, as allocated by a particular execution block. Finally, the global spreader 12 may direct the execution block data move unit 52 to move the data to a desired location in the execution block for processing.

Instead of a packet of vertices, if the global spreader 12 receives a packet of triangles that may not fit in a particular execution block pool, the global spreader 12 may seek to find a suitable execution block using the resource requirement/allocation information, as similarly described above for the packet of vertices. Alternatively, the global spreader 12 may, upon using the indices of the triangle's vertices, retrieve the entity numbers and extract the vertical element numbers. The global spreader 12 may communicate a request to an execution block, such as execution block 19, to allocate an entity for the packet of triangles. Thereafter, the global spreader 12 may communicate the entity numbers of the vertices and the element numbers (1-8) to the particular execution block, such as execution block 19 in this nonlimiting example.

For a given packet of pixels received by global spreader 12, global spreader 12 may seek to find a suitable execution block using the resource requirement/allocation information, as described above in regard to the packet of triangles and the packet of vertices. Alternatively, the global spreader 12 may communicate a request to a particular execution block to allocate an entity for the packet of pixels. In this instance, the global spreader 12 may communicate the entity numbers of the triangles those pixels belong to, as well as their element numbers, to the execution block for further processing.

Thus far, focus has been directed to the global spreader 12 and its function. However, focus is now directed to the pool of execution blocks and their manner of communicating with the global spreader 12 and operating in parallel to each other.

Each execution block contains a queue and cache controller ("QCC") 51. The QCC 51 provides staging in the data stream processing along with data linking to numerical and logical processors, such as for floating point and integer calculations. The QCC 51 assists in the management of a logical graphics pipeline where data entities are created or transformed at each stage of the processing. As described herein, the QCC 51 comprises an entity descriptor, stage parser, and an address rename logic table. (Additional QCC components are described and depicted below.)

For execution block 15, the QCC is shown as reference 51, but is otherwise the same in the remaining execution blocks shown in FIG. 3. QCC 51 has specialized hardware to manage logical FIFOs for data processing stages, as well as for linking the various stages together, as discussed in more detail below. QCC 51 is local to execution block 15, and the other QCCs shown in FIG. 3 are local to their respective execution blocks as well. In this manner, each QCC has global references to other execution blocks' queues to support global ordering if so configured by global spreader 12. Logic in the QCC 51 may cause a data move unit 52 to move the data between the execution block through its various stages and/or to other components, such as another execution block 17, 19, 48, or 49, as shown in FIG. 3.

QCC 51 includes a local cache 54. The data in local cache 54 is not, at least in one nonlimiting example, communicated to any physical FIFO. Instead, all FIFOs are logical with memory references to the various objects. As a nonlimiting example, vertex data associated with a vertex packet may remain in the local cache until the vertex data is processed or will otherwise disappear or be copied to associated triangle entities for further processing, but the vertex data would not remain in local cache 54.

QCC 51 also includes a thread controller 56 that supports multithreading and can run four or more active threads, therefore providing MIMD above SIMD stream type execution at the execution block level. Although described in additional detail below, QCC 51 communicates with a stream numeric pipe and associated registers unit 57 that provide simultaneous execution of floating point and integer instructions, which processes multiple data items in the SIMD stream.

As shown in FIG. 3, the fixed function unit 21, in this nonlimiting example, comprises mostly dedicated fixed function units that have well defined functionality. In at least one nonlimiting example, the fixed function unit 21 includes a pixel packer 49, a tile bypass queue 61, and a reorder buffer 63 with an output tile generator 64 (pixel unpacker). The pixel packer 49 may be configured to reduce the granularity loss on sparse tile processing in the execution block and may also provide pixel packets with valid pixels. The tile bypass queue 61 may be configured to hold all tile pixels masks, while pixels on those tiles are processed in the execution block pool. Also, the output tile generator 64 may be configured to use the tile pixel mask for unpacking pixel information received in the execution block pool. The reorder buffer 63 restores initial order of the pixel packets sent to the execution block pool, as it may also be processed out of order.

FIG. 4 is a diagram of QCC 51 of execution block 15 (or any other execution block of FIG. 3) of FIG. 3 with additional components shown. In this nonlimiting example, QCC 51 includes a communication unit 71 having both an input portion 73 and an output portion 75 wherein data and other information may be received from another execution block and/or output to a different execution block and/or global spreader 12. Communication unit 71 includes a communication controller 77 that may communicate data with the data management move machine 52 via bus 79.

Data may also be communicated by bus 79 to the entity descriptor table 78, which is configured to contain information about assigned packets' data relation, allocation, readiness, and the current stage of processing. The entity descriptor table 78 includes descriptors of entities and associated physical buffers for storing data associated with each entity and various constants. The entity descriptor table 78, in at least one nonlimiting example, may contain up to 256 records of at least two types, including a physical buffer entry and an entity entry. All logical FIFOs used for a virtual graphics pipeline are implemented using the descriptor table 78 and stage parser 82 having a stage pointer table 83.

In at least one nonlimiting example, the entity descriptor table 78 may be based upon a CAM (content addressable memory) and may use two to three fields for associative lookup. As a nonlimiting example, the fields may include an entity number field that may be comprised of eight bits and a logical frame number field comprised of four bits. In this way, the entity descriptor table 78 may be considered as a full associative cache memory with additional control state machines updating some fields of each record according to conditions in the execution blocks at each clock cycle.

Stage parser 82 includes a stage parser table containing pointers for each processing stage in a logical pipeline of a graphics processing nonlimiting example, as shown in FIGS. 5-9 and also discussed below. Stage pointers actually point to the entity to be processed next on each stage. In at least one nonlimiting example, there are two processes that may be associated with each stage—a numerical process or an I/O and data move process. The pointers contained in the stage parser table of stage parser 82 may be used to choose client descriptors with a thread microprogram.

When the stage parser table of stage parser 82 generates a dynamic pointer pointing to a particular entity, client descriptor record contained in the descriptor table 78 may be loaded to the thread controller 56 for numerical stage processing, as described above, which may include floating point and integer instructions. Each stage in stage pointer table has a static pointer to a record in the descriptor table, which defines the thread microcode start address and thread parameters. Logical pipeline functionality is configured by those records pointing to different segments of microcode in instruction memory for numerical data processing.

Alternatively, the stage pointer table of stage parser 82 may contain a pointer to I/O and data move process descriptor that may be utilized by the data management move machine 52 in the case of an I/O process. Although not shown in FIG. 4, the stage parser 82 includes a controller that checks at every clock cycle the status of the entities in the entity descriptor table 78 so that the entities may be processed from stage to stage.

When the QCC 51 operates to communicate data to another execution block, such as execution block 19, the stage parser table may generate a pointer value that is associated with a run data move process, which is communicated to the I/O and move descriptor register table 85. A run data transfer request is communicated from the I/O and move descriptor register table 85 and to the data management microprogram memory 87, which issues an instruction to the data management move machine 52 for accessing the particular data in the cache memory 88 and sending it to the designated memory location.

In the case where the stage parser table of stage parser 82 is involved in a process for the numerical processing of an entity, the stage parser table of stage parser 82 generates a pointer value for executing a numerical process, which is communicated to the numerical process descriptor register table 91. The numerical process descriptor register table 91 communicates with the thread controller 56 for execution of the floating point or integer sequence of instructions associated with the numerical process.

The address rename logic table 94 contains address rename information used to provide flexible mapping of the physical buffers to the cache memory lines 88, as similarly described above. The logic rename table has one or more controllers providing activity and updates to the table. The address rename logic table provides virtual type access to local cache memory. More specifically, the logic table 94 converts a physical buffer number to a cache address. One of ordinary skill would know that the logic table may be configured to operate similarly to a translation look-aside buffer (TLB) in a virtual memory system.

Data management move machine 52 is responsible for all data load and moves inside the execution block and interaction with the global spreader 12, as well as all other execution blocks and fixed function unit 21, as shown in FIG. 1. In at least one nonlimiting example, a thread will not be processed if data is not stored in the execution block's cache memory 88 and/or loaded to the registers, such as the entity descriptor table 78. As such, the data management move machine 52 interacts with the entity descriptor table 78 to acquire the status of entries in the table so as to provide data requested externally to the execution block 15, such as for global reference purposes. As a nonlimiting example, if one vertex of a triangle is processed in a first execution block, for triangle processing purposes, that particular execution block may seek to copy this vertex information to one or more other execution blocks where the remaining vertices of the triangle are being processed or otherwise reside. In this way, the data management move machine 52 provides all interactions of the particular execution block with global resources, as shown in FIG. 1.

Figure 5:
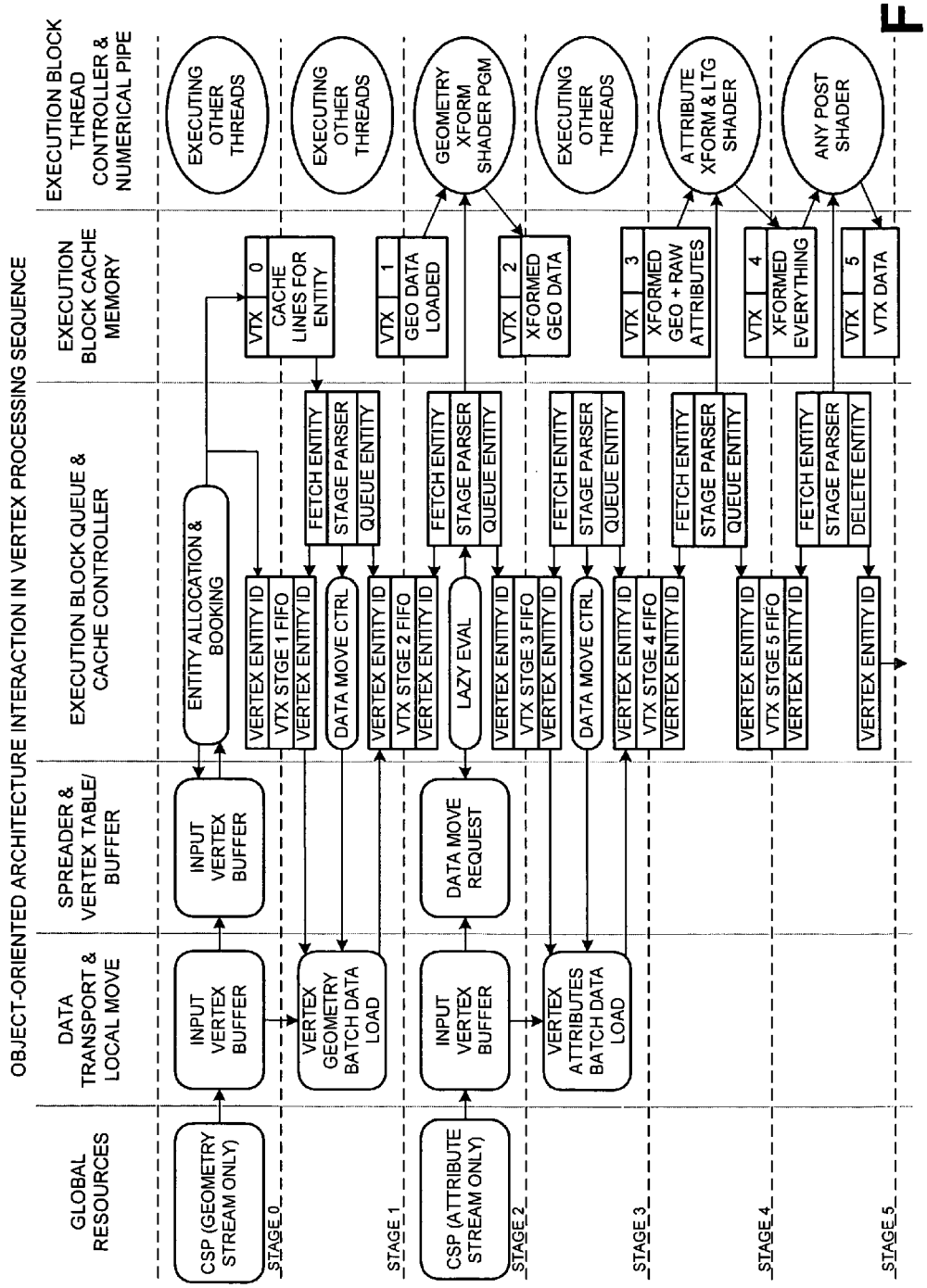
FIG. 5 is an execution flow diagram of the object-oriented architecture interaction in a vertex processing sequence, as executed by the object-oriented architecture of FIG. 1.

FIG. 5 is an execution flow diagram of the object-oriented architecture model 10 of FIG. 1 in a vertex processing sequence. For the vertex objects, reference is made to an "entity," which may be equivalent. Logical FIFOs may not necessarily have physical equivalents, as entities may not change a location in the memory once they have been created. Instead, the stage parser 82 uses pointers to descriptor table to identify an entity so as to push the entity from one state to another.

As shown in the nonlimiting example of FIG. 5, global spreader 12 communicates a geometry stream for a vertex processing sequence to the data management move machine 52 via the input vertex buffer 46 of FIG. 3. The global spreader's 12 vertex table 43 communicates an entity allocation request and books the entity in the vertex table 43. Remaining in stage 0, the execution blocks's queue and cache controller 51 allocates memory resource for one or more logical frames of the entity in cache memory 88 and establishes an entity descriptor table item in table 78. While this entity is allocated, as shown in stage 0, cache lines for the entity are also established in cache memory 88. During this operation, the execution blocks's thread controller and numerical pipe may be executing other threads, as shown in stage 0.

In stage 1, the vertex geometry batch data load may take place upon the stage parser 82 identifying the vertex entity to be stored in cache memory 88. In this operation, stage parser 82 directs data management move machine 52 to obtain the vertex geometry data for cache memory 88.

In stage 2, as shown in FIG. 5, the geometry data loaded in cache memory 88 may be accessed according to stage parser 82 so that the thread controller 56 and numerical pipe may perform, in this nonlimiting example, operations according to a transformation shader program. The resulting data may be stored again in cache memory 88 in stage 2 in advance of operation in stage 3.

In stage 3, the vertex attributes batch data may be loaded according to the stage parser 82 directing the data management move machine 52 to place this data in cache memory 88, as shown in stage 3. At this time in stage 3, the execution block's thread controller 56 and numerical pipe may be executing other threads.

In stage 4, the queue and cache controller's stage parser 82 may direct the transformed geometry and raw attributes to be transferred so that the attribute transform and lightening shader operation may be performed. The resulting data may be stored again in cache memory 88, as shown at stage 4 into stage 5.

In stage 5, the transformed data in cache memory 88 may undergo an additional post-shading operation by the thread controller 56 and numerical pipe upon receipt of a pointer from stage parser 82 for the vertex entity. Upon exiting the post shader, as shown in stage 5 of FIG. 6, the resulting vertex data is again placed in cache memory 88 and subsequently communicated by the data management move machine 52 to either another execution block or an assigned memory location as the global spreader 12 may direct.

At the conclusion of stage 5, the stage parser 82 initiates a "delete entity" command to the entity descriptor table so as to delete the vertex entity ID for this operation. Stated another way, the entity reference may be deleted from the vertex queue, but the vertex data may remain in cache memory 88 so as to be used by triangle entities for other processing operations, as described below. Each of the six stages described above may take place over several cycles, depending upon the microinstructions to be executed and the size of the data to be moved.

Figure 6:
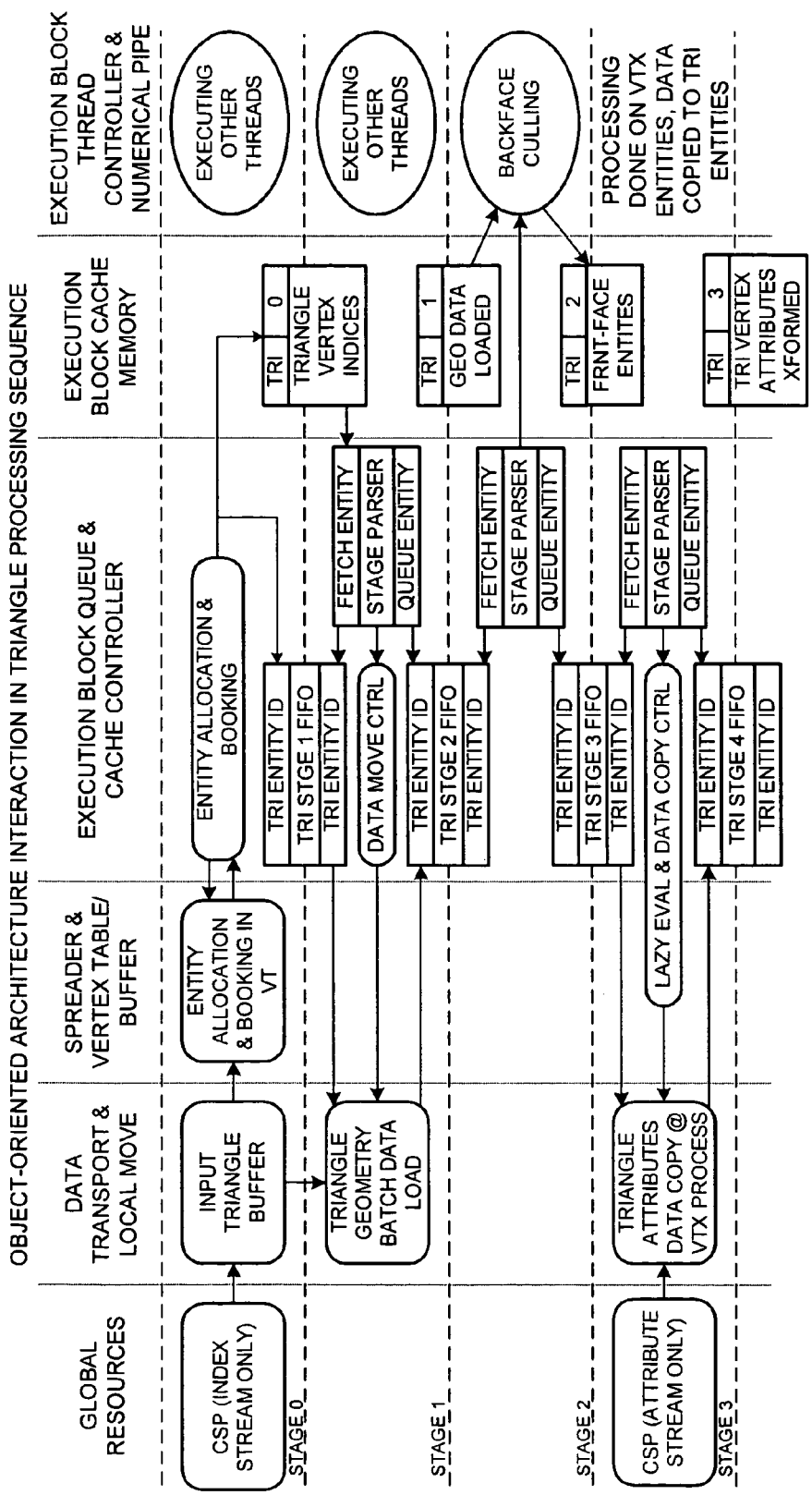
FIGS. 6 and 7 illustrate the object-oriented architecture interaction for a triangle processing sequence for the model of FIG. 1.
Figure 7:
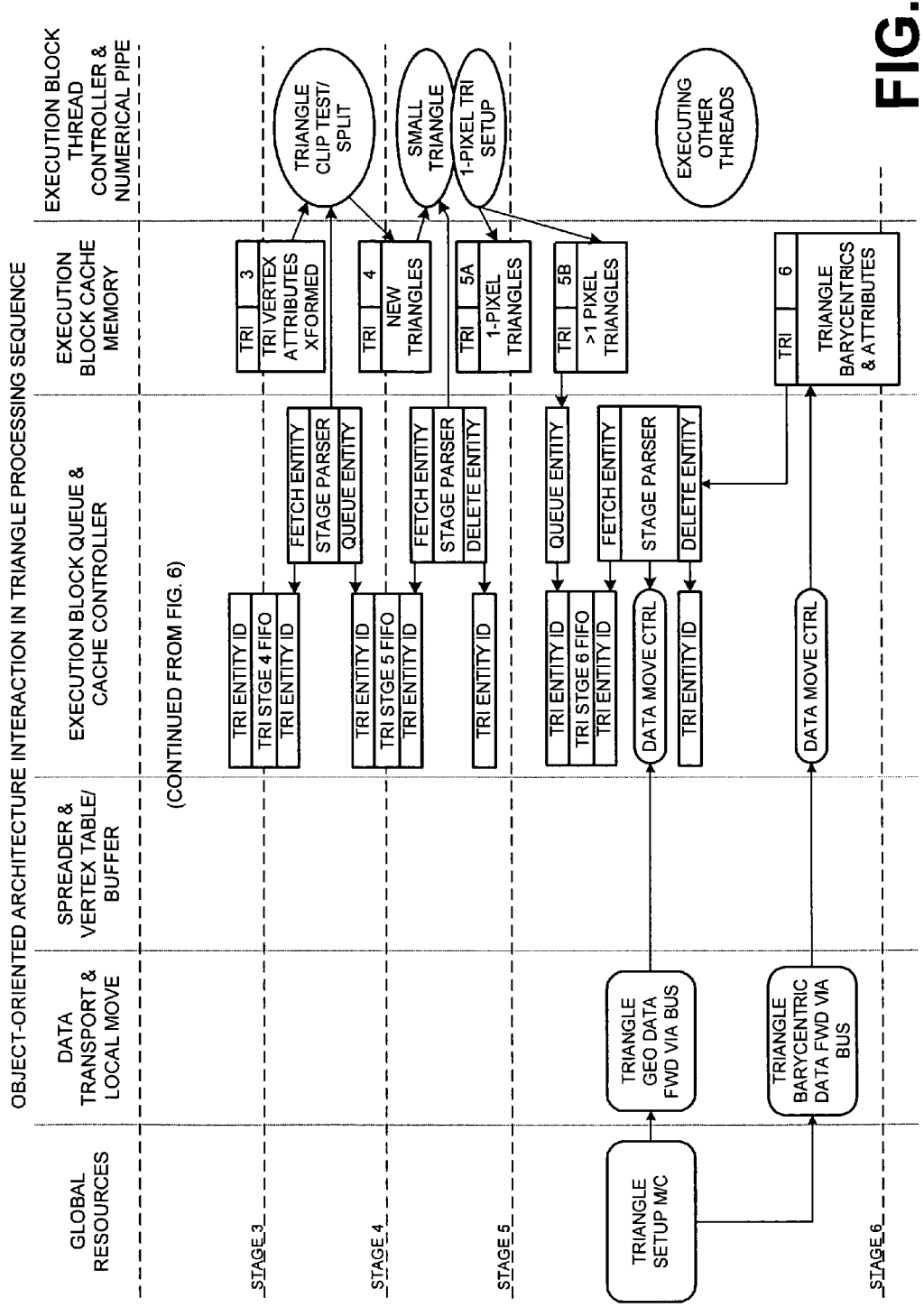

FIGS. 6 and 7 demonstrate the object-oriented architecture interaction for a triangle processing sequence for model 10 of FIG. 1. In stage 0, the global spreader 12 may communicate via the data transport bus 13 with the data management move machine 52 while also allocating the triangle entity quest and booking the request in the vertex table 43. The triangle entity creation process may continue in the execution block QCC 51 by allocating the entity in the entity descriptor table 78 and allocating a memory space in cache memory 88 for the triangle vertex indices and geometry data. During this time, in stage 0, the thread controller 56 and numerical pipe may be executing other threads.

In stage 1, the stage parser 82 may point to the triangle entity allocated in stage 0 and also direct the data management move machine 52 to receive the triangle geometry data that may be copied to cache memory 88 and referenced in the entity descriptor table 78, as shown in stage 1. At this same time, however, the thread controller 56 and numerical pipe may still be executing other threads.

In stage 2, the stage parser 82 may direct the loaded triangle geometry data in cache memory 88 to the numerical pipe with thread controller 56 for, in this nonlimiting example, backface culling. The resulting data may be stored in cache memory 88, as shown in stage 2, with the renamed triangle entity ID retained in entity descriptor table 78.

In stage 3, the numeric pipe with thread controller 56 may conduct processing on the vertex data entities, as described above, which may result from the stage parser 82 referencing the entity descriptor table 78 so that the data move management machine 52 communicates the address information to another execution block that may be processing the vertex entities. In stage 4 (FIG. 7), the triangle vertex attributes that are now stored in cache memory 88 may be executed via thread controller 56 in numerical pipe to perform a triangle clip test/split operation. Again, the resulting data may be stored in cache memory 88 with the queued entry retained in the entity descriptor table 78.

Continuing in this nonlimiting example, stage 5 operation includes the stage parser 82 referencing the entity descriptor table 78 to a small triangle operation in the thread controller 56 and numerical pipe, as well as a one-pixel triangle setup operation. Cache memory 88 stores data related to one pixel triangles and triangles that are less than one pixel. As shown in stage 6, the resulting data related to the triangles is referenced in the entity descriptor table 78 such that a corner is communicated by the stage parser 82 to the data management move machine 52. Stated another way, the resulting triangle geometry data may be forwarded by bus 13 to the global spreader 12 or to another execution block for further processing. Just as described above, each stage may take several clock cycles depending upon the number of microinstructions to be executed and the data size to be moved.

Figure 8:
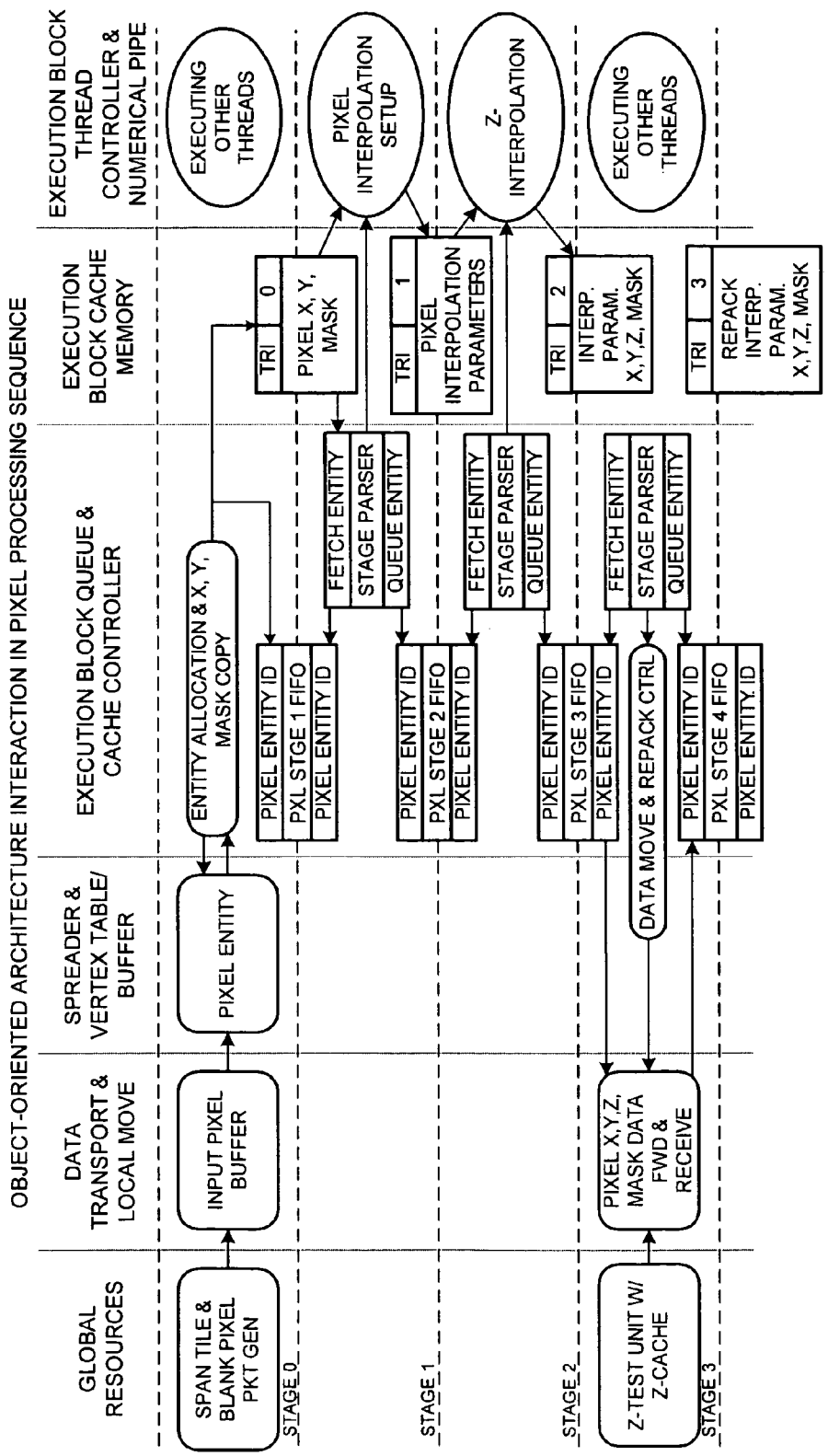
FIGS. 8 and 9 depict the object-oriented architecture model interaction in a. pixel processing sequence for the model of FIG. 1.
Figure 9:
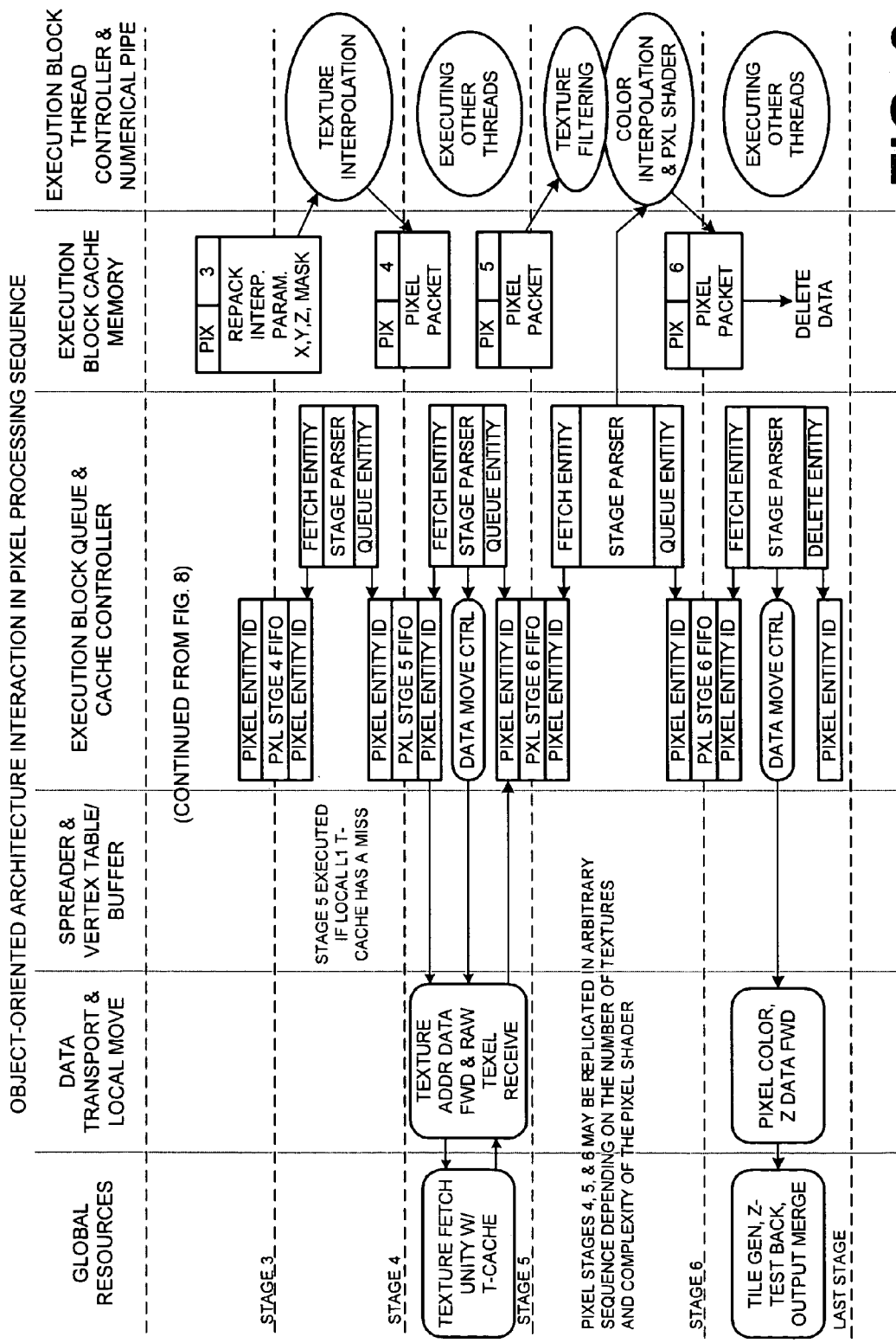

FIGS. 8 and 9 depict the interaction of the object-oriented architecture model 10 in a pixel processing sequence. As shown in FIG. 8, the global resources of the model 10 of FIG. 1 may establish in the input buffer 46 of global spreader 12 an input pixel entity in stage 0. This entity creation also occurs in the QCC 51 such that a pixel entity ID is created in the entity descriptor table 78 and pixel memory is allocated in cache memory 88, as shown in stage 0. At this time, the thread controller 56 and numerical pipe may be executing other threads.

In stage 1, however, stage parser 82, via its stage parser table, fetches the pixel entity ID in the entity descriptor table such that the pixel data in cache memory 88 is communicated to thread controller 56 and the numerical pipe for, in this nonlimiting example, a pixel interpolation setup operation. The resulting data is returned to cache memory 88 as the pixel interpolation parameters. Also, stage parser 82 cues the pixel entity ID related to this manipulated data in stage 1.

In stage 2, the stage parser 82 fetches the pixel entity ID in the entity descriptor table 78 so that the pixel interpolation parameters in cache memory 88 are communicated to the thread controller 56 in numerical pipe for a Z-interpolation operation. The resulting manipulated data is returned to cache memory 88 and the stage parser 82 queues the pixel entity ID in entity descriptor table 78. However, as an alternative embodiment, stage 2 may be skipped if fixed function unit 21 is utilized for Z-interpolation, as a nonlimiting example. In this nonlimiting example, pixel packer 49 may thereafter receive data directly from the Z-interpolation unit (not shown).

Continuing this nonlimiting example, the pixel entity ID may be communicated by the data transport system to receive pixel XYZ and masked data, as directed by the stage parser and the data management move machine. At this time, the thread controller 56 may be engaged in executing other threads.

In stage 4 (FIG. 9), the stage parser 82 may acquire the pixel entity ID such that a texture interpolation operation is performed on the data in cache memory 88, which may comprise repack interpolation parameters of X, Y, Z and mask data information. As a result of this operation, stage 4 may be concluded with pixel packet data stored in cache memory 88. Texture address data may be received by the data transport system 13 upon forwarding processed information to other execution blocks for processing in stage 5. Depending upon the number of textures and the complexity of the pixel shader, stages 4, 5, and 6 may be replicated in arbitrary sequence. Nevertheless, as shown in stage 6, the pixel packet data in cache member 88 may be manipulated in a texture filtering and/or color interpolation in pixel shader operations, in similar fashion as described above. In the last stage, as shown in FIG. 9, stage parser 82 directs the pixel entity ID to the data management move machine 52 such that the final pixel data is forwarded from the execution block for further processing and/or display.

As described above, the global spreader 12 may allocate a vertex, triangle, and/or pixel entity to one or more execution blocks for processing. While the description above depicts that the global spreader 12 may allocate a vertex, triangle, or pixel packet to one or more execution blocks, at least one alternative embodiment provides that the global spreader 12 may make such allocations according to a predetermined priority preference.

Figure 10:
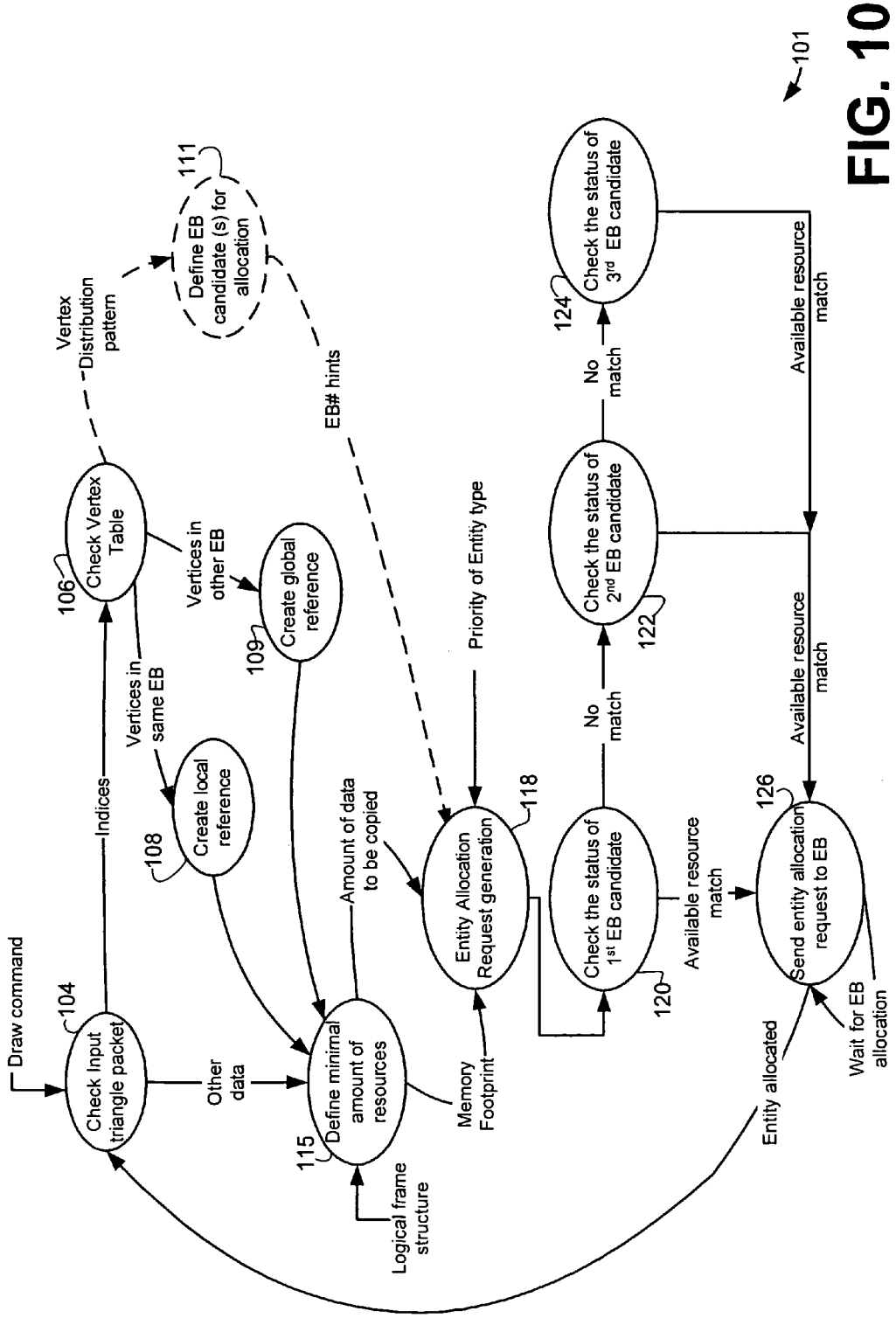
FIG. 10 is a diagram of a nonlimiting example flowchart depicting allocation of a triangle entity between the global spreader and an execution block of FIG. 1.

FIG. 10 is a diagram 101 of a nonlimiting example flowchart depicting allocation of a triangle entity between the global spreader 12 and an execution block of FIG. 1. In FIG. 10, a draw command may be received at step 104 in the global spreader 12, which causes the global spreader 12 to check the triangle input packet. If the triangle input packet contains indices, step 106 may be executed in global spreader 12 such that the vertex table 43 is accessed in regard to the triangle packet received.

If the global spreader 12 determines that the vertices related to the triangle packet are located in one execution block, the global spreader 12 may create a local reference 108; however, if the global spreader 12 determines that the vertices related to the triangle packet are located in multiple execution blocks, the global spreader 12 may create a global reference 109 so that the processing of data on the multiple execution blocks can be orchestrated in parallel.

Global spreader 12 proceeds thereafter from step 108 or 109, depending upon whether the vertices are located in one or a plurality of execution blocks to step 115, which operates to define a minimal amount of resources for execution of the triangle packet. Data, in addition to the indices from step 104, may also be considered at step 115 so that an appropriate amount of resources may be allocated for the triangle packet. Also, data related to the logical frame structure for execution of the triangle packet may also be considered at step 115.

Upon identifying a minimal amount of resources for execution as shown in step 115, the global spreader 12 generates an entity allocation request at step 118. This entity allocation request includes an amount of data to be copied as produced by step 115, as well as a memory footprint also from step 115.

The entity allocation request step 115 may also receive a defined list of candidate execution blocks for receiving the entity allocation request, as well as a priority index for the entity type to be executed.

As shown in step 120, the global spreader 12 checks the status of a first execution block candidate, which may be according to the defined execution block candidate list from step 111 and/or the priority related to the entity type to be executed. If the first execution block candidate has an available resource match for the allocated entity, the global spreader 12 sends an entity allocation request to the first execution block, as shown in step 126, and thereafter waits for receipt from the execution block upon completion. After the entity is allocated, global spreader 12 reverts back to step 104 to receive an additional next triangle drawing command.

However, if the first execution block candidate is not an available resource match for the entity allocated in step 118, the global spreader 12 resorts to a second execution block candidate, as shown in step 122. If this second execution block candidate is an available resource match, step 126 is executed, as described above. However, if the second execution block candidate is not a match, the global spreader 12 reverts to the third execution block candidate, as shown in step 124. Depending upon whether this block is a match, the global spreader 12 may resort to one or more additional execution block candidates until a proper match candidate is found for allocating the entity to be processed.

This process described in FIG. 10 may not only occur for triangle packets, but may also occur for vertex and pixel packets as well, as one of ordinary skill in the art would know. However, in each instance, the global spreader 12 selects a candidate execution block as similarly described above.

The foregoing description has been presented for purposes of illustration and description. It is not intended to be exhaustive or to limit the disclosure to the precise forms disclosed. Obvious modifications or variations are possible in light of the above teachings. The embodiments discussed, however, were chosen, and described to illustrate the principles disclosed herein and the practical application to thereby enable one of ordinary skill in the art to utilize the disclosure in various embodiments and with various modifications as are suited to the particular use contemplated. All such modifications and variation are within the scope of the disclosure as determined by the appended claims when interpreted in accordance with the breadth to which they are fairly and legally entitled.

The invention claimed is:

1. A dynamically scheduled parallel graphics processor, the processor having an object-oriented architecture, the processor comprising:

a global spreader configured to create multiple types of graphics object entities to be processed and to assign and distribute the created graphics object entities for processing;

a plurality of nonspecialized execution blocks coupled to the global spreader and configured to receive an assignment for processing multiple types of graphics object entities from the global spreader and to push the graphics object entities through one or more stages of processing, wherein each nonspecialized execution block dynamically schedules processing of the assigned graphics object entities, makes information about an assigned graphics object entity available to one or more other nonspecialized execution blocks, and executes one or more instruction operations on the assigned graphics object entity; and a descriptor table configured to provide a registry of graphics object entities being processed by the nonspecialized execution block, wherein a special control bit in the descriptor table configures the plurality of nonspecialized execution blocks to process the assigned graphics object entity sequentially.

2. The processor of claim 1, wherein the global spreader allocates graphics object entities associated with a triangle graphics object entity to a nonspecialized execution block also assigned to process the triangle graphics object entity.

3. The processor of claim 1, further comprising:

logic in the global spreader configured to maintain and update at each clock cycle for each nonspecialized execution block the amount of available resources, the entities being processed, physical buffer data for each entity, and available cache memory.

4. The processor of claim 1, further comprising:

logic in the global spreader configured to prioritize each nonspecialized execution block of the plurality of nonspecialized execution blocks for being assigned a particular graphics object entity.

5. The processor of claim 1, further comprising:

logic executable by the global spreader configured to establish and maintain data layout preferences for triangle graphic object entities in association with corresponding vertices and pixels.

6. The processor of claim 1, wherein each of the plurality of nonspecialized execution blocks comprises:

a stage parser containing descriptor table pointers configured to point to a graphics object entity to be moved or processed;

a thread controller configured to manage execution of floating point and integer instructions; and a data move machine configured to load and move graphics object entities in the nonspecialized execution block and further configured to communicate with the global spreader and other nonspecialized execution blocks.

7. The processor of claim 6, further comprising:

a rename logic table configured to provide flexible address mapping of physical buffers in a cache memory.

8. The processor of claim 6, wherein the descriptor table contains information about data relation, allocation, readiness, and current stage in association with the processing of a graphics object entity.

9. The processor of claim 6, wherein the pointers contained in the stage parser table point to the graphics object entity to be processed on each stage of a logical graphics pipeline.

10. The processor of claim 9, wherein a process associated with a stage includes moving a graphics object data within the nonspecialized execution block, to another nonspecialized execution block, or to the fixed function unit.

11. The processor of claim 6, wherein the descriptor table is a content addressable memory.

12. The dynamically scheduled parallel graphics processor of claim 6, wherein the plurality of nonspecialized execution blocks is configured to use the descriptor table to process the assigned graphics object entities out of order.

13. The processor of claim 1, further comprising:

logic in the global spreader configured to maintain a primitive table containing primitive ID information when a triangle entity is allocated.

14. The processor of claim 13, wherein the primitive table has a primitive ID field and an nonspecialized execution block field corresponding to a particular nonspecialized execution block where a triangle entity is allocated.

15. The dynamically scheduled parallel graphics processor of claim 1, further comprising:
   one or more fixed function units coupled to the global spreader and the plurality of nonspecialized execution blocks and configured to execute one or more predetermined operations on a graphics object entity; and
   an input/output unit coupled to the global spreader, the one or more fixed function units, and the plurality of nonspecialized execution blocks configured to provide access to an external memory.

16. The processor of claim 15, wherein the one or more fixed function units perform rasterization, texturing, or outputting of pixel processing parts.

17. The dynamically scheduled parallel graphics processor of claim 1, wherein the assigned graphics object entity includes numerical data and control data, and wherein each nonspecialized execution block executes one or more programmable instruction operations according to the control data of the assigned graphics object entity.

* * * * *